United States Patent [19]

Cartwright et al.

[11] Patent Number: 4,821,921
[45] Date of Patent: Apr. 18, 1989

[54] LIQUID DISPENSING APPARATUS

[76] Inventors: Garry E. Cartwright, 28 Hathaway Gardens, Waterlooville, Hants; Paul Palmer, 8 St. Matthews Road, Cosham, Hants, both of England

[21] Appl. No.: 943,411

[22] Filed: Dec. 19, 1986

Related U.S. Application Data

[63] Continuation-in-part of Ser. No. 635,912, Jul. 30, 1984, abandoned.

[30] Foreign Application Priority Data

Aug. 1, 1983 [GB] United Kingdom ............... 8320655

[51] Int. Cl.⁴ ............................................. B67D 5/08
[52] U.S. Cl. .................................... 222/65; 222/144.5; 222/319; 222/424; 222/426; 222/510; 222/504; 141/245
[58] Field of Search ............... 222/318, 319, 510, 504, 222/424, 431–433, 65, 144.5, 424.5, 425, 426, 129.1, 145, 596, 40, 64, 66; 141/245, 94, 115

[56] References Cited

U.S. PATENT DOCUMENTS

| | | |
|---|---|---|
| 1,244,585 | 10/1917 | Case .............................. 222/319 |
| 1,296,032 | 3/1919 | Adsit ........................... 222/319 X |
| 1,360,023 | 11/1920 | Risser .......................... 141/245 |
| 1,602,686 | 10/1926 | Leet ............................. 222/319 X |
| 1,683,337 | 9/1928 | Ernest et al. . |
| 2,167,690 | 8/1939 | Sennis . |
| 3,168,967 | 2/1965 | Giampa ....................... 222/129.1 |
| 3,688,947 | 9/1972 | Reichenberger . |
| 3,699,315 | 10/1972 | Upton . |
| 3,890,968 | 6/1975 | Pierce et al. . |
| 3,976,222 | 8/1976 | Spagnolo .................. 222/144.5 X |
| 4,046,287 | 9/1977 | Hoekstra . |
| 4,111,492 | 9/1978 | Mraz . |
| 4,225,057 | 9/1980 | Horn . |
| 4,252,253 | 2/1981 | Shannon . |
| 4,278,186 | 7/1981 | Williamson . |
| 4,331,262 | 5/1982 | Snyder . |
| 4,369,898 | 1/1983 | Andersson ................ 222/144.5 X |
| 4,386,716 | 6/1983 | Buck . |
| 4,433,795 | 2/1984 | Maiefski et al. ............ 222/144.5 X |
| 4,436,223 | 3/1984 | Wilson ............................ 222/40 |
| 4,450,981 | 5/1984 | Haig ............................... 222/61 |
| 4,450,987 | 5/1984 | Boettcher et al. .......... 222/504 X |
| 4,583,664 | 4/1986 | Bayat ............................. 222/61 |
| 4,603,792 | 8/1986 | Molineux ...................... 222/40 X |
| 4,619,378 | 10/1986 | deMan ...................... 222/129.2 X |

FOREIGN PATENT DOCUMENTS

| | | |
|---|---|---|
| 0013134 | 7/1980 | European Pat. Off. . |
| 3509189 | 3/1985 | Fed. Rep. of Germany ...... 222/40 |
| 210757 | 1/1924 | United Kingdom . |
| 2028768 | 3/1980 | United Kingdom . |
| 2040266 | 8/1980 | United Kingdom . |
| 2084546 | 4/1982 | United Kingdom . |
| 2116763 | 9/1983 | United Kingdom . |

Primary Examiner—Joseph J. Rolla
Assistant Examiner—Gregory L. Huson
Attorney, Agent, or Firm—Oliff & Berridge

[57] ABSTRACT

Liquid dispensing apparatus is disclosed having at least one liquid dispensing chamber and an associated prefill chamber with displacement mechanism for transferring liquid therefrom to the dispensing chamber. The dispensing chamber is in communication with the prefill chamber over a weir so that liquid in the dispensing chamber in excess of a predetermined measure flows back over the weir to the prefill chamber. The dispensing chamber has an outlet openable and closable by a seal to dispense the measure held in the dispensing chamber.

11 Claims, 14 Drawing Sheets

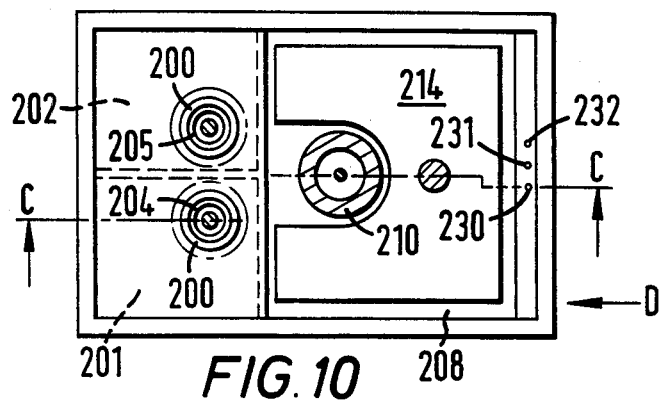
FIG. 10
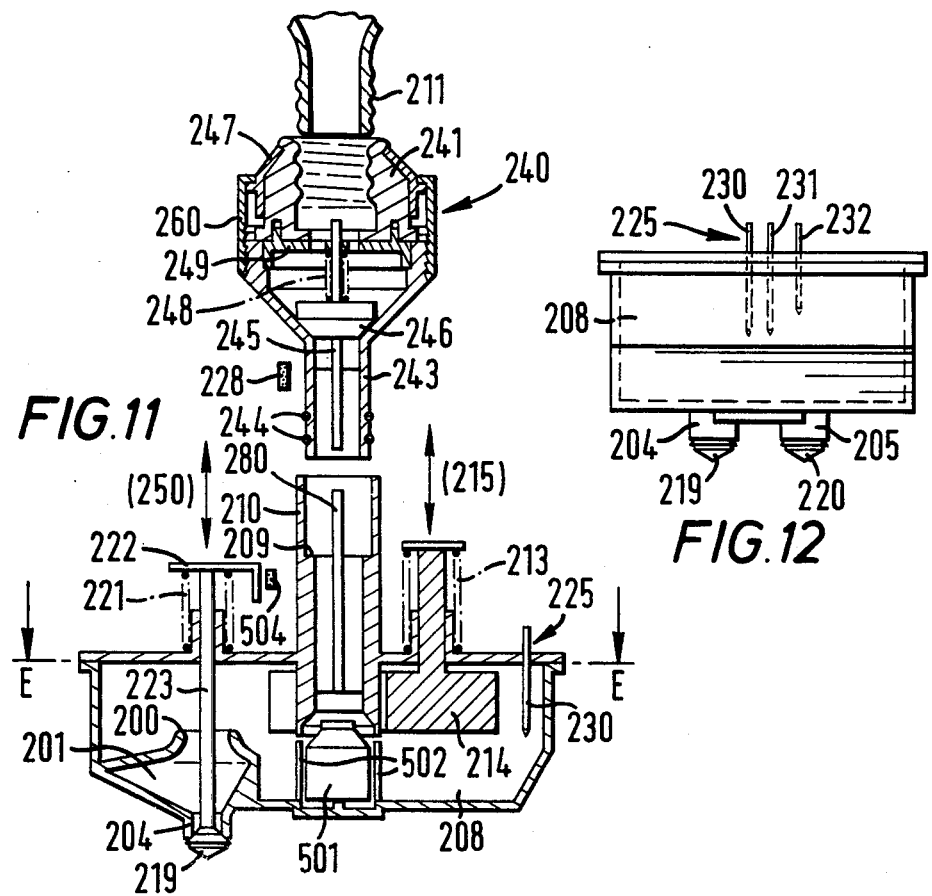
FIG. 11
FIG. 12

LIQUID DISPENSING APPARATUS

BACKGROUND OF THE INVENTION

This application is a continuation-in-part of Application Ser. No. 635,912 filed July 30, 1984, now abandoned.

The invention relates to liquid dispensing apparatus and relates particularly, but not exclusively, to apparatus for dispensing drinks in accurate measures.

On licensed premises, such as bars, at least alcoholic drinks are traditionally served in particular measures. The conventional way of dispensing required volumes has been to pour from a bottle into a measuring vessel then to transfer the contents of the measuring vessel into the glass (or other drinking vessel) from which the drink will be consumed. This method is slow, inconvenient and messy due to the intermediate measuring vessel and the likelihood of spillage, and moreover the accuracy of the measures dispensed is low.

More recently a dispensing device known as an "Optic" has been developed consisting of a transparent container, with an inlet and outlet, which is attached to the top of an opened bottle. The bottle with the container attached is up-ended and attached to a support. Under the action of gravity, the container fills through the inlet, the required measure being the volume of the container. A glass is pushed up against the outlet causing it to open and dispense the measure into the glass, at the same time the inlet being maintained shut. When the glass is retracted, the outlet is shut and the inlet opens and the container is refilled under gravity from the bottle. Although representing an improvement in terms of speed, convenience and accuracy, this device is unhygienic due to the contact of the glass with the device and the accuracy is still not good, being officially given as −3% to +6% but in practice, particularly with rushed staff, often being worse.

Liquid dispensing apparatus of higher accuracy has been constructed but typically such apparatus involves means for precision metering of the liquid and is consequently expensive.

The invention provides liquid dispensing apparatus comprising a liquid dispensing chamber defining therein a volume measure and having an outlet, means for opening and closing the outlet, a prefill chamber, and means for filling the dispensing chamber with liquid from the prefill chamber, the dispensing chamber being in communication with the prefill chamber in such a way that liquid in excess of the measure overflows back to the prefill chamber.

The filling means preferably comprises a displacement device for displacing liquid in the prefill chamber thereby causing liquid to flow into the dispensing chamber. The displacement device may be solenoid operated.

The apparatus may further comprise switch means for initiating a dispensing cycle during which the outlet is opened thereby dispensing the measure in the dispensing chamber, whereafter the outlet is closed and the dispensing chamber is refilled from the prefill chamber.

The apparatus may further comprise a second liquid dispensing chamber defining therein a volume measure and having an outlet, means for opening and closing that outlet, and control means for operating both outlets whereby to dispense the measures held in either or both of the dispensing chambers. There may be a second prefill chamber and means for filling the second dispensing chamber from the second prefill chamber, the second dispensing chamber being in communication with the second prefill chamber in such a way that liquid in excess of the measure overflows back to the second prefill chamber. Alternatively, the filling means may operate to fill the second dispensing chamber from the same prefill chamber used for filling the first dispensing chamber, the second dispensing chamber being in communication with the prefill chamber in the same way as the first dispensing chamber.

The apparatus may include means for monitoring and recording the volume of liquid dispensed, comprising a controller responsive to signals indicative of liquid dispensed from the apparatus.

Typically, the liquid would be supplied under gravity feed to the or each prefill chamber to replace the liquid transferred to the or each dispensing chamber, but it is conceivable that liquid could be pumped into the or each prefill chamber.

Optionally, the apparatus may include detection means located adjacent the outlet of the or each dispensing chamber to detect leaks therefrom and provide an indication of the discharge of a measure of liquid from the dispensing chamber.

Overmeasure sensor means may be provided for detecting overfilling of the or each dispensing chamber, and undermeasure sensor means may similarly be provided for detecting underfilling of the or each prefill chamber.

It will be appreciated that the drinks dispensing apparatus of the invention is capable of dispensing measured quantities of any liquid but is particularly applicable to the dispensing of spirits or wine.

BRIEF DESCRIPTION OF THE DRAWINGS

Embodiments of the invention will now be described, by way of example only, with reference to the accompanying drawings, in which:

FIG. 10 is a sectional plan view of a third drink dispensing apparatus, embodying the invention;

FIG. 11 is a sectional elevation taken on the section station C-C of FIG. 10 but showing the bottle and bottle adaptor detached from the apparatus, the section station of FIG. 10 being shown at E—E;

FIG. 12 is a rear elevation taken in the direction of arrow D of FIG. 10 but showing only part of the apparatus;

DETAILED DESCRIPTION OF THE PREFERRED EMBODIMENTS

Figure 1:
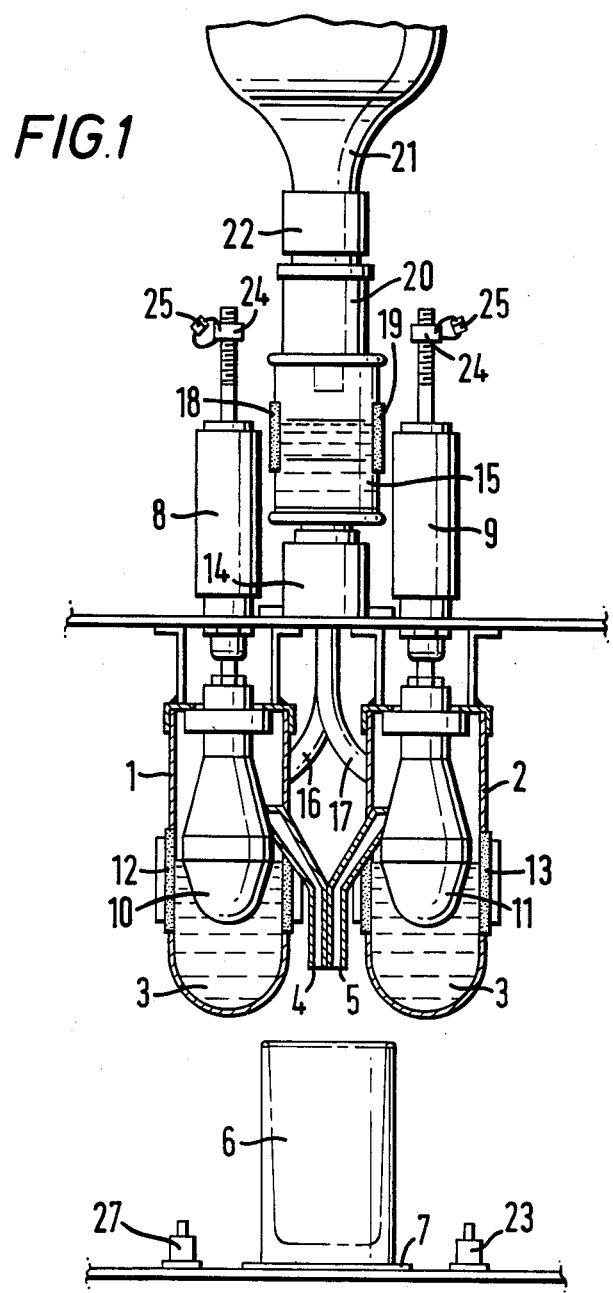
FIG. 1 is a schematic front elevational view of a first drink dispensing unit showing the unit in a quiescent, non-energised state.
Figure 2:
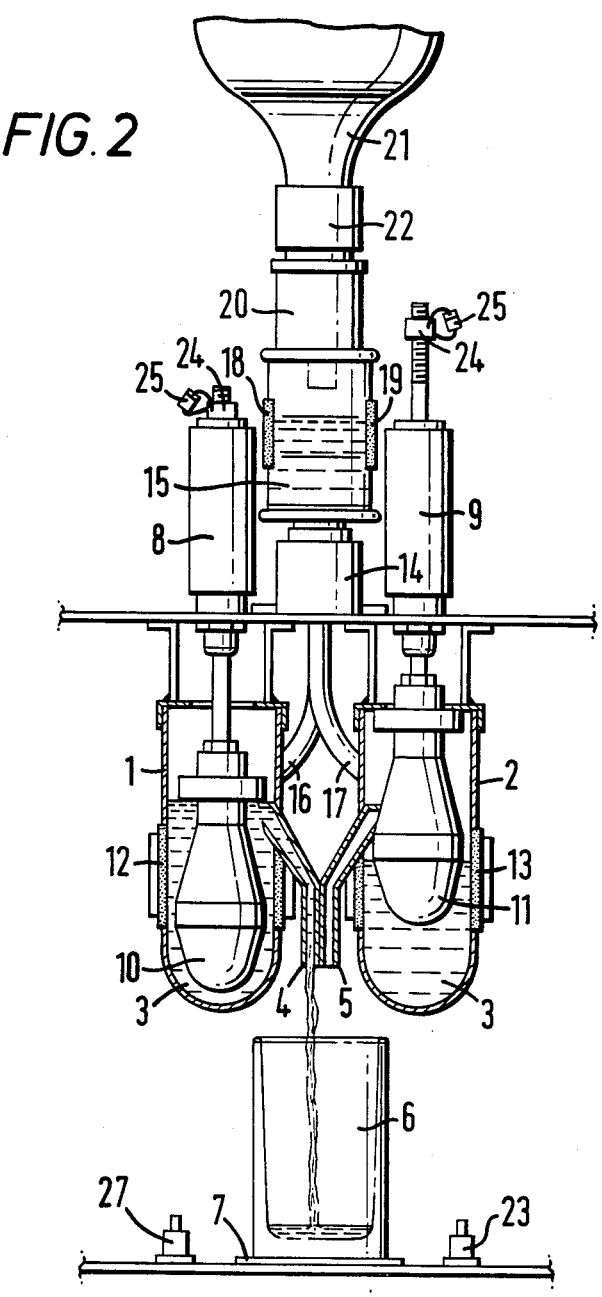
FIG. 2 is a view identical with that of FIG. 1 but showing the unit in an energised state.

Referring initially to FIGS. 1 and 2, the drink dispensing unit shown is intended particularly for the dispensing of spirits normally dispensed on licensed premises from "Optics". The dispensing unit includes two liquid dispensing or displacement chambers, 1, 2, each containing and capable of dispensing a measure 3 of spirits or the like independently of the other. Each liquid dispensing chamber 1, 2 is provided with a single separate discharge outlet 4, 5 to allow a measure of liquid from each chamber to be dispensed into a container such as the glass 6. The latter is located on a plate start actuator 7 which is connected in circuit with a single cycle trip device 27 and with a pair of electrically operated solenoid valves 8, 9. The movable member of each solenoid valve 8, 9 is coupled to a respective liquid displacement device 10, 11 extending within the respective liquid dispensing chamber 1, 2. Liquid level sensors 12, 13 are associated with the respective liquid dispensing chambers 1, 2 and monitor the displacement of the liquid therein. Said sensors are arranged to produce an output signal whenever a correct predetermined volume of liquid has been dispensed from the respective liquid dispensing chamber 1, 2. A three position solenoid valve 14 is associated with a prefill chamber having the form of a liquid reservoir 15 and is responsive to the output signal from the liquid level sensors 12, 13 and is actuated to allow a predetermined volume, or measure of the liquid being dispensed, to flow from the liquid reservoir 15 to whichever liquid dispensing chamber (1 or 2) has been discharged, via the inlet feed pipes 16, 17. Reservoir level sensors 18, 19 monitor the level of liquid in the liquid reservoir 15 and a double check on the volume of liquid dispensed is provided by the dispensing chamber level sensors 12, 13. When a complete measure of liquid has been passed from the liquid reservoir 15 to a liquid dispensing chamber, an output signal is supplied from the reservoir level sensors 18, 19 to a two position actuator 20 to effect actuation thereof and allow liquid from a bottle or other container 21 located in a bottle acceptor 22, to be passed to the liquid reservoir 15 to top-up the level of the liquid therein.

A double cycle trip device 23 connected in circuit with the plate start actuator 7 and with the single cycle trip device 27 is provided for dispensing double measures of the liquid alternately from each dispensing chamber 1, 2. Interlocks are provided either electrically or electronically operated to allow continuous dispensing of the liquid from the two liquid dispensing chambers 1, 2, i.e. whilst one chamber e.g. 1 is discharging liquid into the container 6, the other chamber 2 is being re-charged with liquid from the liquid reservoir 15.

Fine setting adjustment means 24 are provided for the valves 8, 9, and these are fitted with anti-tamper seals 25.

In operation, and referring to FIG. 2, liquid is dispensed from the unit by placing the glass 6 on the plate start actuator 7. Depression of the button of the single cycle trip device 27 will effect energisation of the solenoid of valve 8 to effect movement of the displacement device 10 downwards by a predetermined amount. The sensor 12 monitors the displacement on the return stroke and an output signal is presented to the valve 14 if the correct measure has been discharged, causing valve 14 to open and allowing a measure of the liquid to pass from the reservoir 15 via the inlet pipe 16 to the chamber 1. When the liquid level sensor 12 and reservoir level sensors 18, 19 confirm that the correct volume of liquid has been transferred, a signal is sent to the two position actuator 20 to actuate it to the open position to allow the reservoir 15 to be topped-up from the bottle 21; the reservoir level sensors 18, 19 monitor the level of liquid in the reservoir and provide a signal when the operation is completed to indicate that the discharged chamber 1 is again available for the receipt of liquid to be dispensed.

Figure 3:
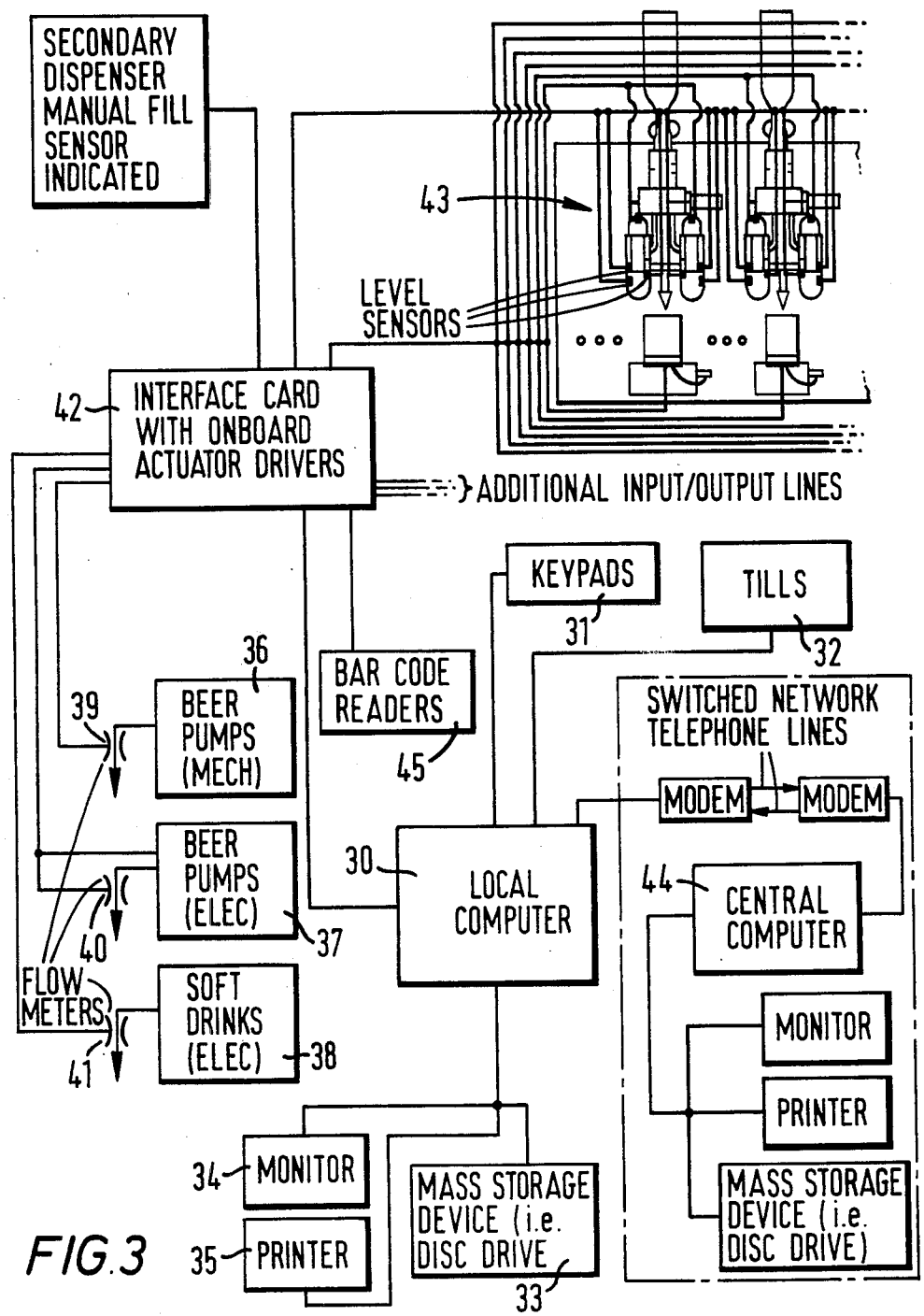
FIG. 3 is a schematic block diagram of a computerised drink dispensing and monitoring system, of which drink dispensing apparatus according to the invention may form part.

Referring now to FIG. 3 of the drawings, apparatus is illustrated that is designed to monitor, evaluate and record automatically any beverage dispensed on all types of licensed premises whether the beverage be alcoholic or non-alcoholic.

The apparatus includes a local computer 30 which is coupled to keypads 31 and all tills 32. A storage unit 33 records all information supplied to or fed from the computer 30 and a visual display may be provided on a monitor or VDU 34 whilst a printer 35 provides a recorded print-out of the data.

All beer pumps (mechanical) 36, all beer pumps (electrical) 37 and all soft drink pumps (electrical) 38 are connected via respective flow meters 39, 40, 41, to an interface card 42 connected to the computer 30 in order that all draught beers and soft drinks dispensed may be monitored and recorded. Bottled or canned drinks which are computer coded would be arranged to pass an encoder and to be recorded by the computer. Bar code readers 45 are connected to the interface card 42, to record in the computer 30 all bottled and canned products.

A bank 43 of dispensing units, each as in FIGS. 1 and 2 or as described hereinafter, would have an output connected via the interface card 42 to the computer 30 to record all measures dispensed.

The apparatus would also incorporate a feed to a central computer 44 via standard telephone lines and the central computer 44 would have the same visual display, printed data and storage facilities as the local computer 30.

The main purposes of the computerised arrangement described would be to provide a high security system and to ensure that for each dispensing operation, a full measure is dispensed, providing at the same time recorded data representing a record of each drink dispensed and, if required, details of any money transactions.

The system would also provide for stock control and indicate when replacement goods require to be ordered to supplement or replace stocks. The central computer 44 would provide a print-out or visual indication of any stock requirements.

Figure 4:
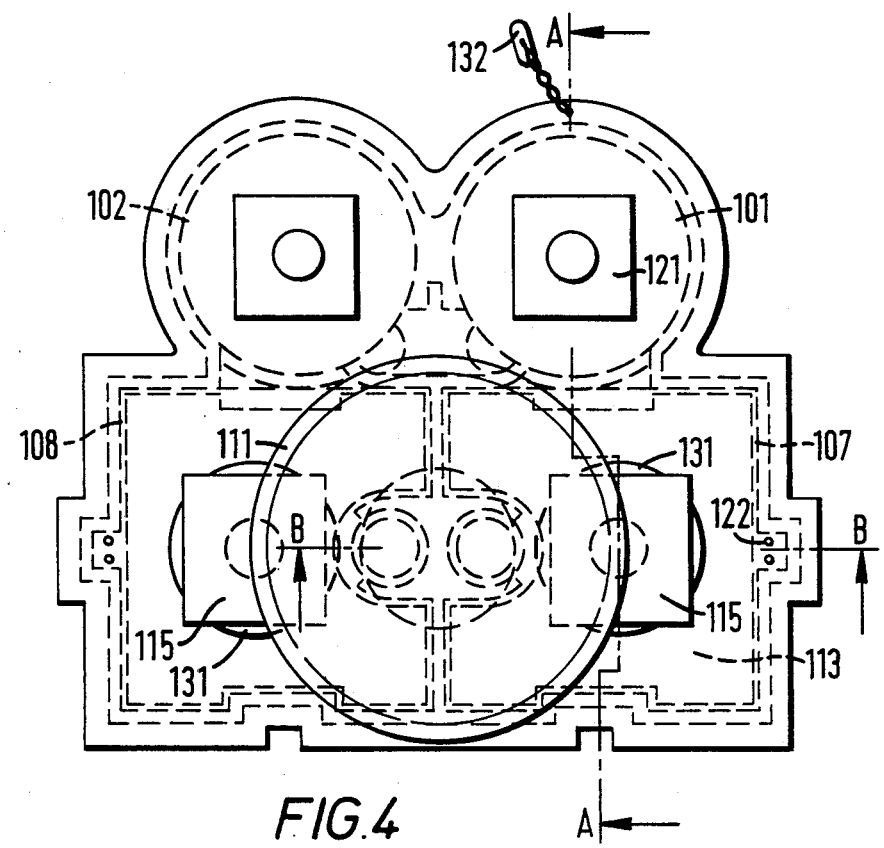
FIG. 4 is a plan view of a second drink dispensing unit, according to the invention.
Figure 5:
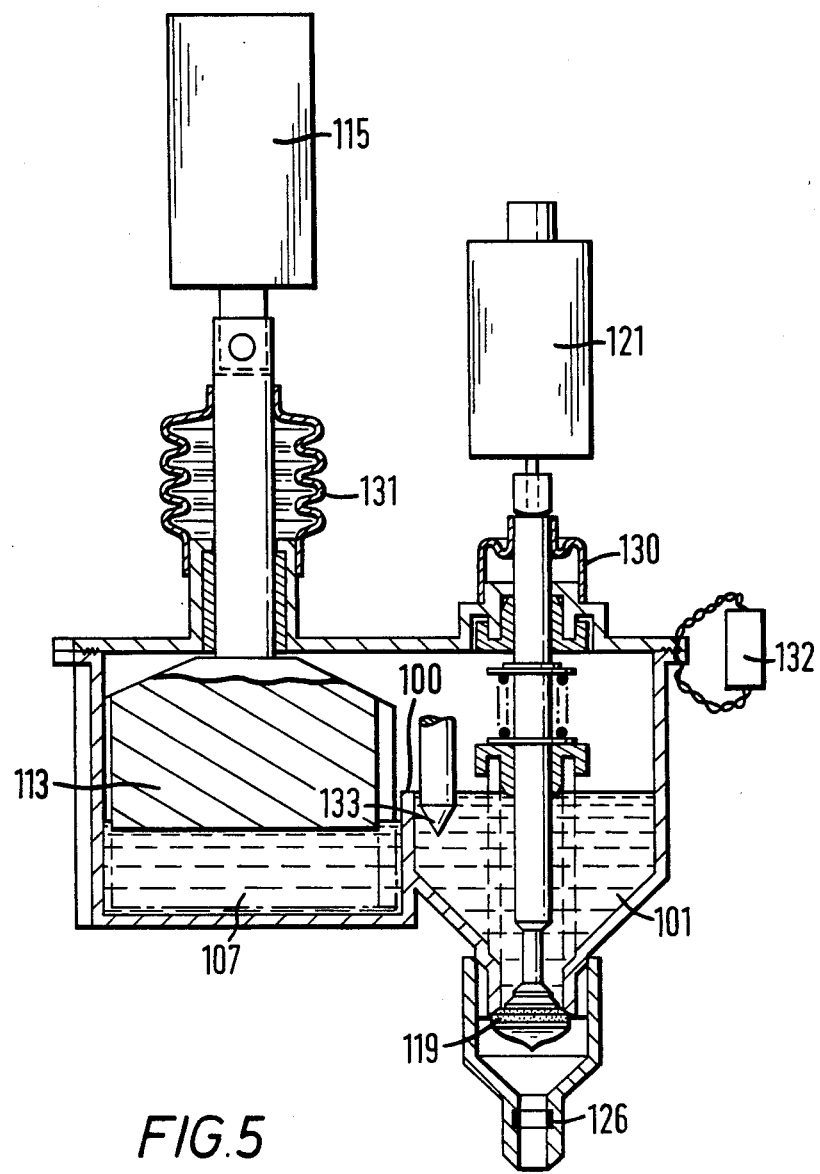
FIG. 5 is a sectional view taken on the section station A-A of FIG. 4.
Figure 6:
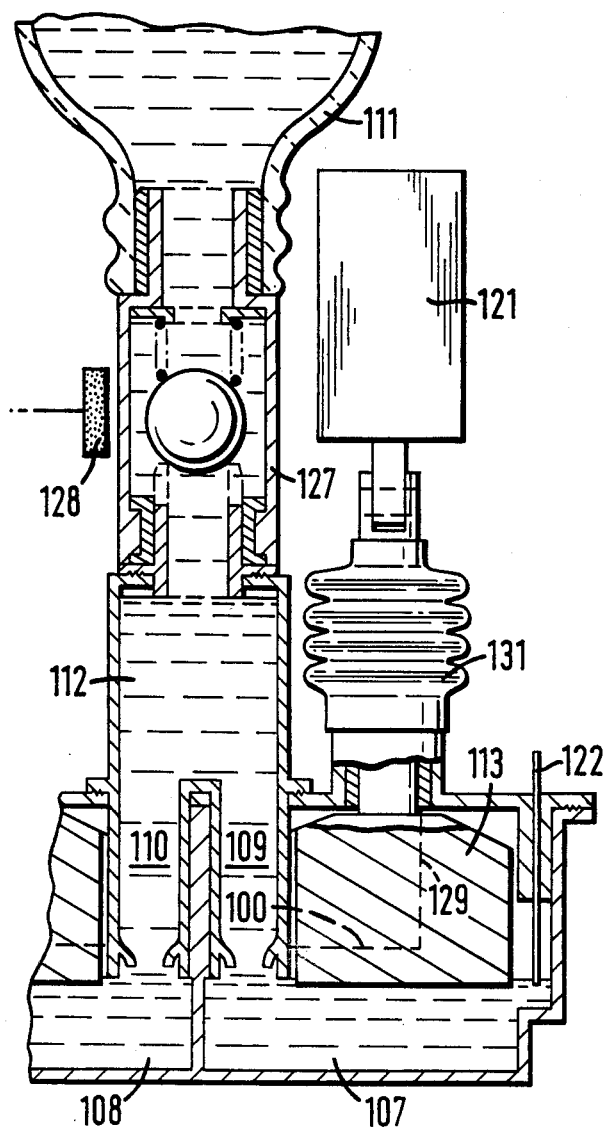
FIG. 6 is a sectional view taken on the section station B-B of FIG. 4.

A second drink dispensing apparatus, embodying the invention, is shown in FIGS. 4 to 6. FIGS. 8A to 8D illustrate this apparatus in simplified schematic form. Two drink dispensing chambers 101, 102 each contain and are capable of dispensing a single measure of drink 103 independently of the other. Each chamber 101, 102 is provided with a separate discharge outlet 104, 105 to allow a measure from each chamber 101, 102 to be dispensed into a glass or other container 106 (see FIG. 8A). Each dispensing chamber 101, 102 has in communication therewith a respective prefill chamber 107, 108 gravity fed with liquid via feed conduits 109, 110 respectively, from a bottle 111 via a reservoir 112 (not represented in FIGS. 8A to 8D). The volume of the measure is defined by the height of the "weir" 100; after a dispensing chamber has been filled from its prefill chamber, any liquid in excess of the measure flows back over the weir automatically into the prefill chamber by gravity.

Each prefill chamber 107, 108 is provided with a displacement device 113, 114 operated by a respective actuator 115 (FIG. 5) preferably solenoid-operated and arranged to be energised in response to the closing of the contacts of either a single or double measure request device 117, 118, provided that a pressure pad switch 116 is closed by the presence of a glass 106. The devices 117, 118 are provided with respective push buttons suitably colour coded for operator identification. Depression of one of the buttons, with a glass 106 present, will cause a measure of drink to be dispensed from one of the chambers 101, 102, or a double measure to be dispensed by discharging both dispensing chambers 101, 102, into the glass 106, according to the particular button depressed.

Each dispensing chamber is provided with a respective seal 119, 120 connected to a respective actuator 121, one of which is shown in FIG. 5, the actuator 121 preferably being solenoid operated. A plurality of sensor devices are associated with the prefill and dispensing chambers; undermeasure sensors 122, 123 are located in respective prefill chambers 107, 108 and overmeasure sensors 124, 125 are located in dispensing chambers 101, 102 respectively. A leak detector 126 is located intermediate the discharge outlets 104, 105 of the dispensing chambers 101, 102 and the glass 106, to provide an indication of any leaks from the dispensing chambers and also to provide an indication that a measure has in fact been dispensed from a dispensing chamber.

Figure 8A:
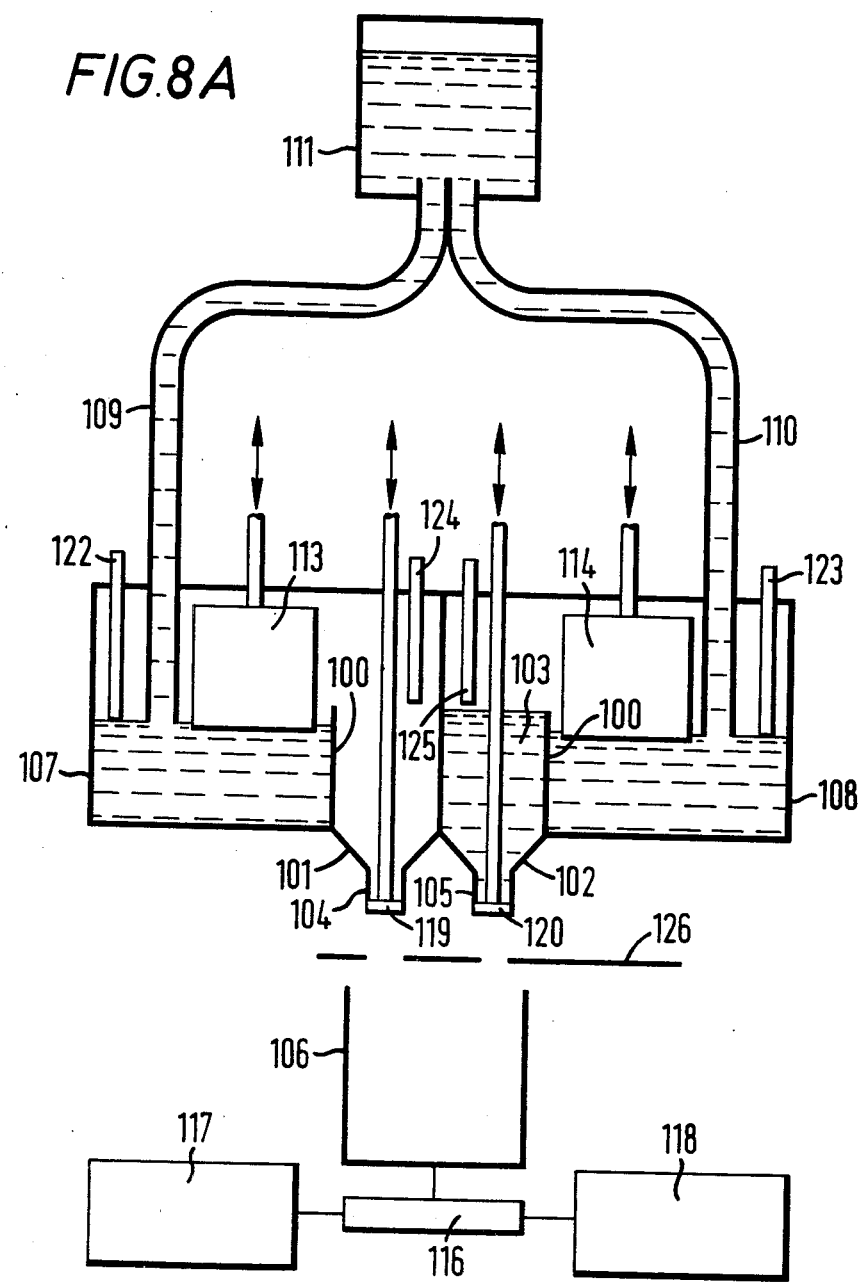
FIGS. 8A to 8D are a series of simplified schematic views of the apparatus shown in more detail in FIGS. 4 to 6 and illustrating the dispensing sequence.
Figure 8B:
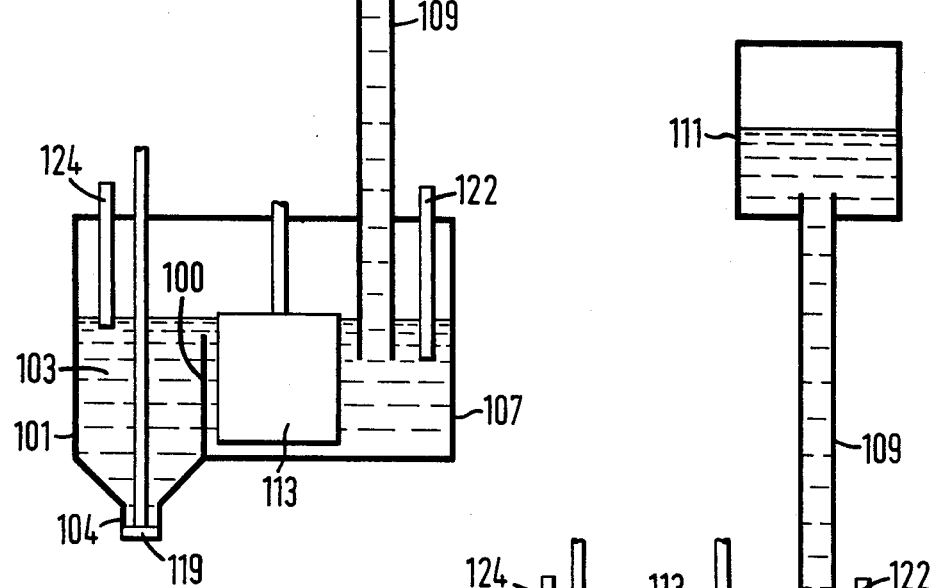
Figure 8C:
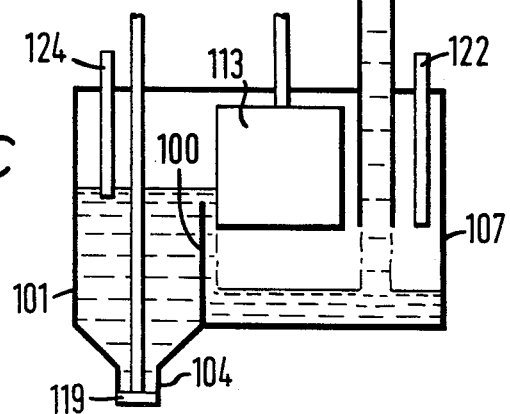
Figure 8D:
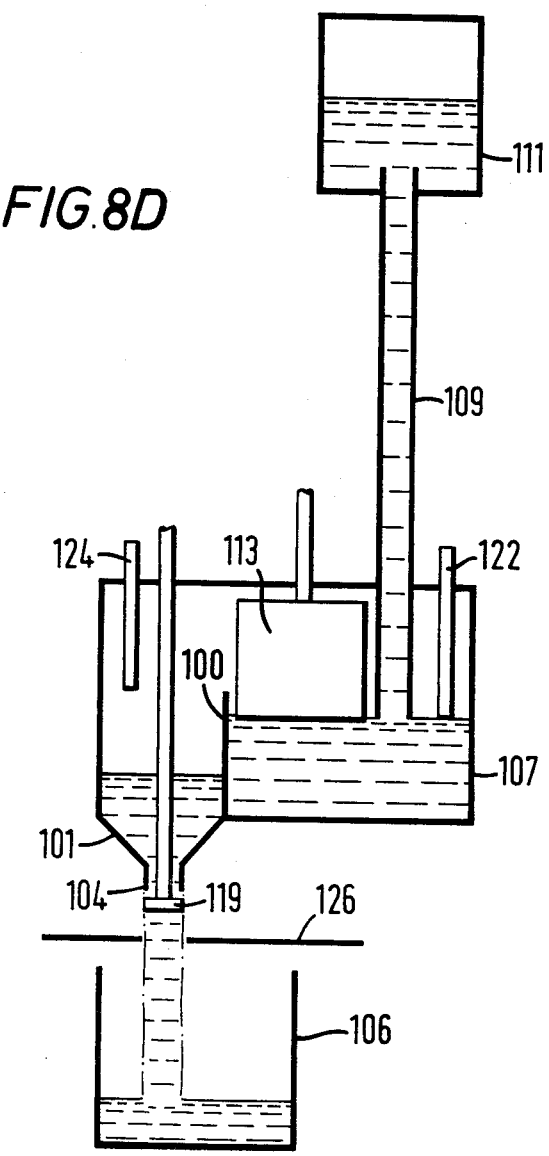

The operation of the dispensing apparatus will now be described, commencing with a condition in which dispensing chamber 101 is empty as shown in FIG. 8A. The glass 106 is placed on the pressure pad switch and a cycle is initiated by depression of the single measure button 117 or double measure button 118. The undermeasure sensor 122 will sense the level of liquid in prefill chamber 107 and will produce an inhibit signal if the level is below a predetermined value. If no inhibit signal is present, the actuator 115 (not shown in FIG. 8A) is energised to depress the displacement device 113 of prefill chamber 107, which displaces liquid from prefill chamber 107 to dispensing chamber 101. The overmeasure sensor 124 senses the rise in the level of the liquid in dispensing chamber 101 (FIG. 8B). The displacement device 113 is retracted by de-energisation of the solenoid. Any excess liquid in dispensing chamber 101 will overflow back into prefill chamber 107 (see FIG. 8C), which will be topped-up by gravity feed from the bottle 111 until the liquid level rises to the bottom of conduit 109.

If no overmeasure is sensed by sensor 124 (an overmeasure could be caused by flooding of the chambers 103, 107 or by the displacement device 113 not having retracted properly) the actuator 121 is operated to move the seal 119 away from the discharge outlet 104 of the dispensing chamber 101 (FIG. 8D) and allow the measure in the chamber 101 to be discharged into glass 106. A signal from the leak detector 126 will indicate that a measure of liquid has been dispensed and this signal is passed to actuator 121 to allow the seal 119 to be reclosed.

Referring to FIG. 6, the bottle 111 is mounted in a bottle adaptor 127. A bottle detector 128 is located adjacent the bottle adaptor to indicate whether an adaptor with associated bottle is present or not above the reservoir 112. The opening from prefill chamber 107 to dispensing chamber 101 is shown at 129, the lower edge of this opening forming the weir 100.

Referring to FIG. 5, gaiters 130, 131 are provided between the actuators 121 and the dispensing chambers, and between the actuators 115 and the prefill chambers 107. A tamperproof seal 132 is provided on each dispensing chamber to comply with Weights and Measures requirements. In order to allow for calibration of the measured volume of liquid in each dispensing chamber, a calibration device 133 (FIG. 5) is provided for each dispensing chamber 101, 102. The calibration device is movable in a direction into and out of the dispensing chamber (for example by being threadedly mounted in the roof of the chamber) so as to adjust the volume of the chamber.

Figure 9:
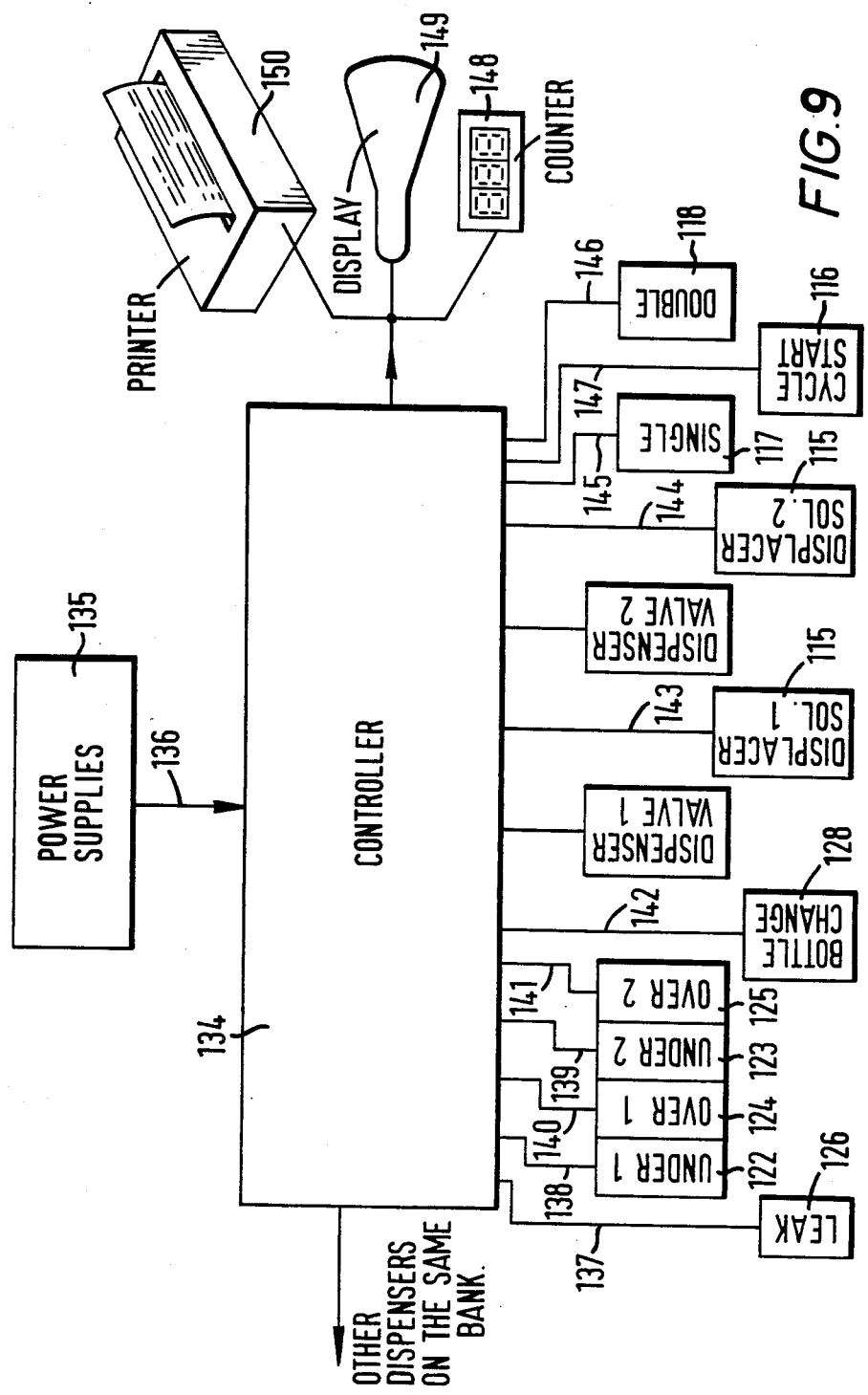
FIG. 9 is a block diagram of the electrical connections to the various components of the apparatus shown in FIGS. 4 to 6 and 8A to 8D.

Referring to FIG. 9, a controller in the form of a printed circuit board 134 is provided to control the electrical and electronic circuits of the apparatus. The controller 134 is connected to other dispensers on the same bank and receives power from the power supply pack 135 over line 136. The various sensors and actuators are connected to the controller 134 as shown.

The leak detector 126 is connected to the controller 134 via line 137. The undermeasure sensors 122, 123 are connected to the controller via lines 138, 139 respectively and the overmeasure sensors 124, 125 are connected to the controller 134 via lines 140, 141 respectively. The bottle detector 128 is shown connected to controller 134 via line 142. The displacement device solenoid actuators 115 are connected to controller 134 via lines 143, 144. The single and double buttons 117, 118 and the cycle start switch 116 are connected to the controller via lines 145, 146, 147 respectively.

Output lines from the controller are connected to data reproducing devices such as counter 148 which visually indicates the number of measures dispensed, a VDU 149 which displays the data visually and a printer 150 which records the data in legible form.

Figure 7:
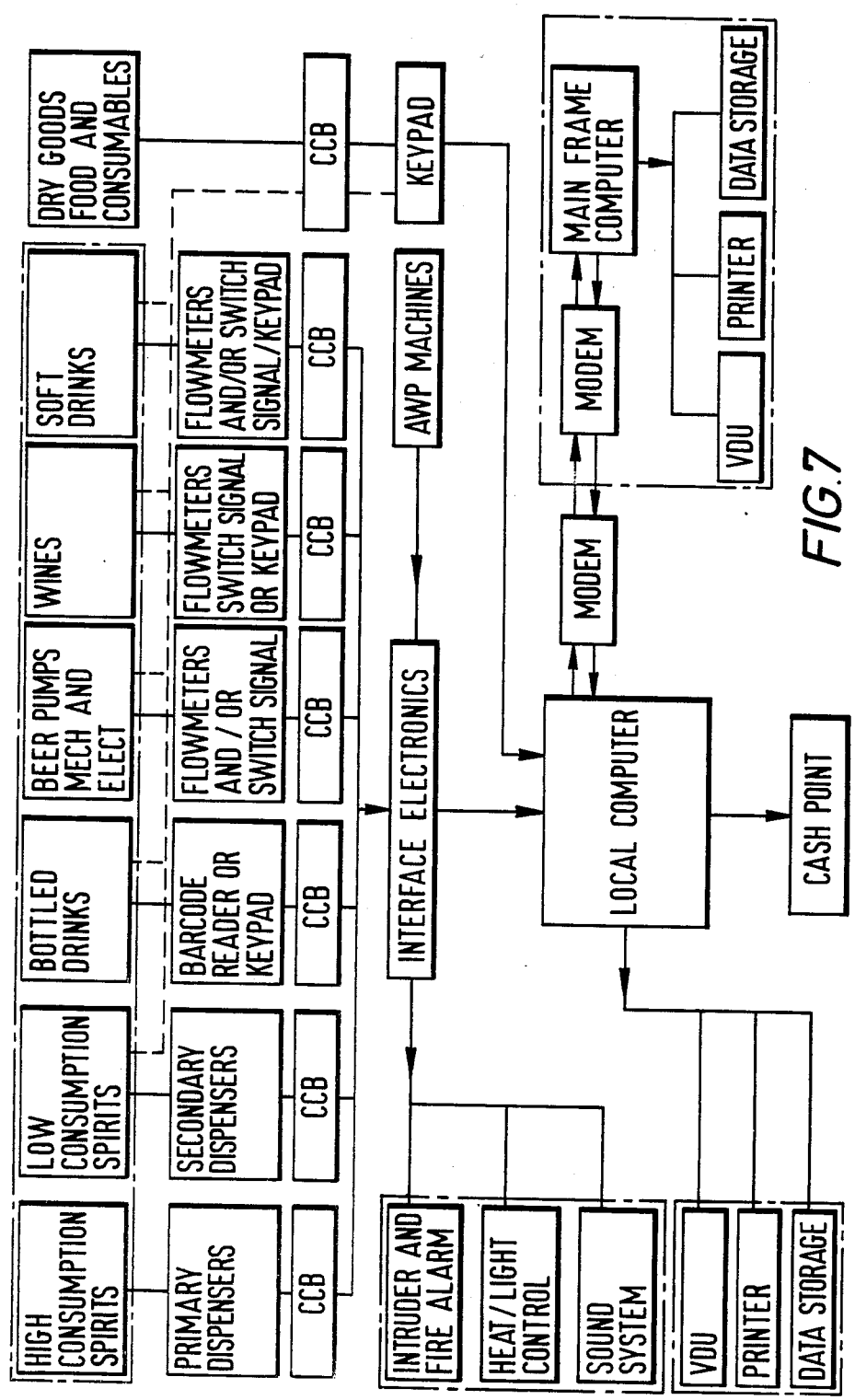
FIG. 7 is a schematic block diagram encompassing the possible range of products and optional services which may interface with the drink dispensing apparatus of the invention.

The flow diagram of FIG. 7 illustrates how the drink dispensing apparatus described herein may be incorporated into a system for measuring, monitoring and recording the dispensing of drinks both alcoholic and non-alcoholic. The apparatus described is utilised for the PRIMARY DISPENSERS but similar apparatus may also be used for the SECONDARY DISPENSERS. CCB indicates Colour Coded Button.

The embodiment of FIGS. 10 to 13 is similar in basic respects to the embodiment of FIGS. 4–6 and 8A–8D but in this case there is only a single prefill chamber 208 for filling both dispensing chambers 201 and 202. As in the embodiment of FIGS. 4–6 and 8A–8D, the height of the weirs 200 (which separate the dispensing chambers from the prefill chamber and which in this embodiment are circular in plan) defines the required volume measures in the dispensing chambers 201, 202. The drink to be dispensed, spirits or the like, is supplied to the prefill chamber 208 through a feed pipe 210 which extends down into the prefill chamber to a level below that of the weirs; a distance of 10 mm below the level of the weirs has been found suitable. A float 501 is arranged in the prefill chamber 208 between float guides 502 so as to seal off the outlet of the feed pipe 210 when the liquid level in the prefill chamber rises to a certain level.

The dispensing chambers 201, 202 are filled with liquid from the prefill chamber 208 by virtue of the displacing action of a solenoid 215 operating the device 214. The solenoid (not shown) operating the displacement device 214 is single acting in a downward direction, compression spring 213 providing the return, upward motion when the solenoid is de-energized. The outlets 204, 205 of the dispensing chambers 201, 202 are openable and closable by seals 219, 220. Each seal 219, 220 is operated by a respective solenoid 250, 251 which again is single acting in a downward direction, the return upward movement being provided by a respective compression spring 221 which acts against a cap 222 fixed to shaft 223 on which the respective seal 219, 222 is mounted.

A liquid sensor 225 is mounted in the prefill chamber 208. This sensor comprises three probes 230, 231 and 232 of which probe 231 is electrically common, 230 is a lower sensor and 232 is an upper sensor. The three probes are set at appropriate heights as required, preferred positions being 1 mm below the level of weirs 200 for probes 230, 231 and 4 mm above the level of the weirs for probe 232. When the liquid level rises to the probes 230, 231, a circuit is completed between those probes while if the level rises further to probe 232, a circuit is completed between that probe and probe 231. (Reference should be made to FIG. 12, which also shows outlets 204, 205 and seals 219, 220 but other details are omitted from this figure).

In order to engage a bottle 211 of the spirits or other drink to be dispensed with the apparatus, a bottle adaptor 240 is provided. The structure of this adaptor will be apparent from FIG. 11. The adaptor comprises a rubber annulus 241 which can be compressed onto the neck of the bottle 211 by tightening a hand nut 260, the nut 260 being threadedly engaged with the lower body part 243 of the adaptor. Rotation of nut 260 relative to part 243 draws annular intermediate member 247 towards part 243 and insert 249 which is secured to part 243, thereby causing the compression of annulus 241. Part 243 is provided with O-ring seals 244 for liquid-tight engagement with the interior of the upper part of feed pipe 210. A central spindle 245, mounted for sliding movement within the adaptor body, carries a rubber seal 246 biased downwardly by a compression spring 248 for preventing throughflow of liquid when the adaptor 240 is detached from the apparatus. A central spindle 280 mounted rigidly to and centrally of the feed pipe 210 by supports (not shown) is provided to abuttingly engage spindle 245 when the adaptor 240 is engaged in the feed pipe 210, thereby moving the seal 246 out of contact with the lower body part 243 of the adaptor and allowing liquid to flow through the adaptor 240. Thus the adaptor is first pushed onto the bottle 211 and the hand nut 260 tightened to compress seal 241 which both grips and seals the bottle neck, following which the lower adaptor body part 243 is pushed into the pipe 210 to rest against internal shoulder 209.

Optionally, a sensor 228 may be provided so as to provide a check that a bottle with adaptor is in position.

To provide confirmation that seals 219, 220 have opened to dispense the measures of drink held in the respective dispensing chambers, sensors 504, 505 may be provided, such as optical sensors co-operating with slots in the cap 222 connected to the seal shafts 223.

As in the embodiment of FIGS. 4–6 and 8A–8D, single and double measure request buttons 217, 218 are provided, connected to pressure pad contact switch 216 which is closed by a glass 206 resting on it. A leak detector 226 similar to detector 126 is positioned between the dispensing chambers and the glass 206.

Figure 14:
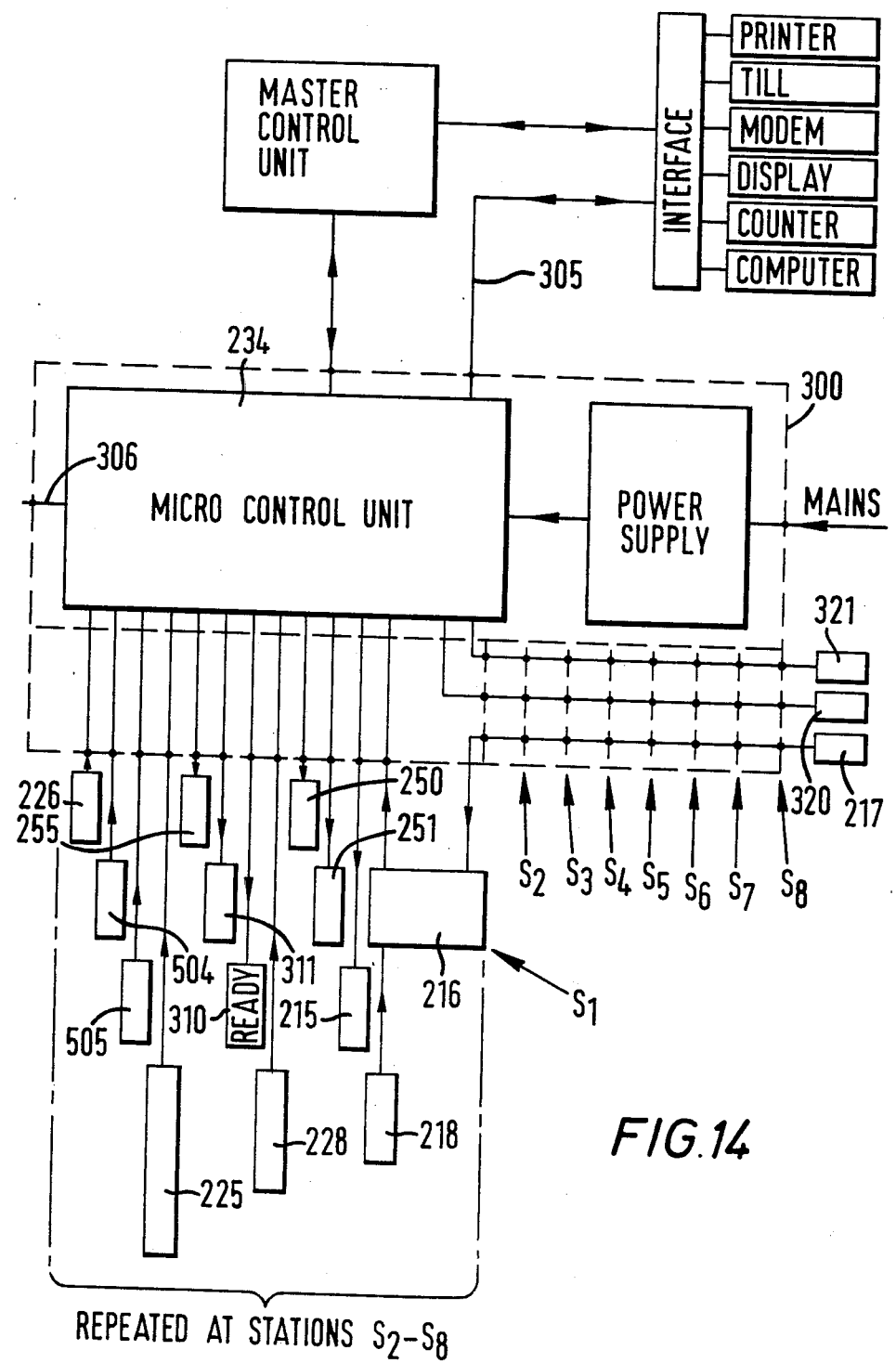
FIG. 14 is a block diagram of a drink dispensing and recording system showing electrical connections of the apparatus of FIGS. 10-13.

FIG. 14 shows the electrical connections of the apparatus connected into an overall drink dispensing, monitoring and recording system. Drink dispensing unit 300 comprises eight sets of dispensing apparatus or stations $S_1$ to $S_8$ as described i.e. with sixteen dispensing outlets. Only the connections for dispensing station $S_1$ are shown, these being duplicated for the other seven stations. In this particular arrangement, single measure button 217 is common to all the stations but each station has its own double measure button 218. Other dispensing units 300 may be connected up together (see line 306) to feed into the master control unit. Line 305 is an optional alternative to feed directly from the controller 234 to the interface, omitting the master control unit. Button 320 is provided to close down any of the eight dispensing stations and to reset a closed down station to bring it back into use. "Error input" button 321 is merely for accounting purposes, to record when a drink has been dispensed but is not actually sold (e.g. if the operator demands in error a drink other than the one requested by the customer).

Figure 13:
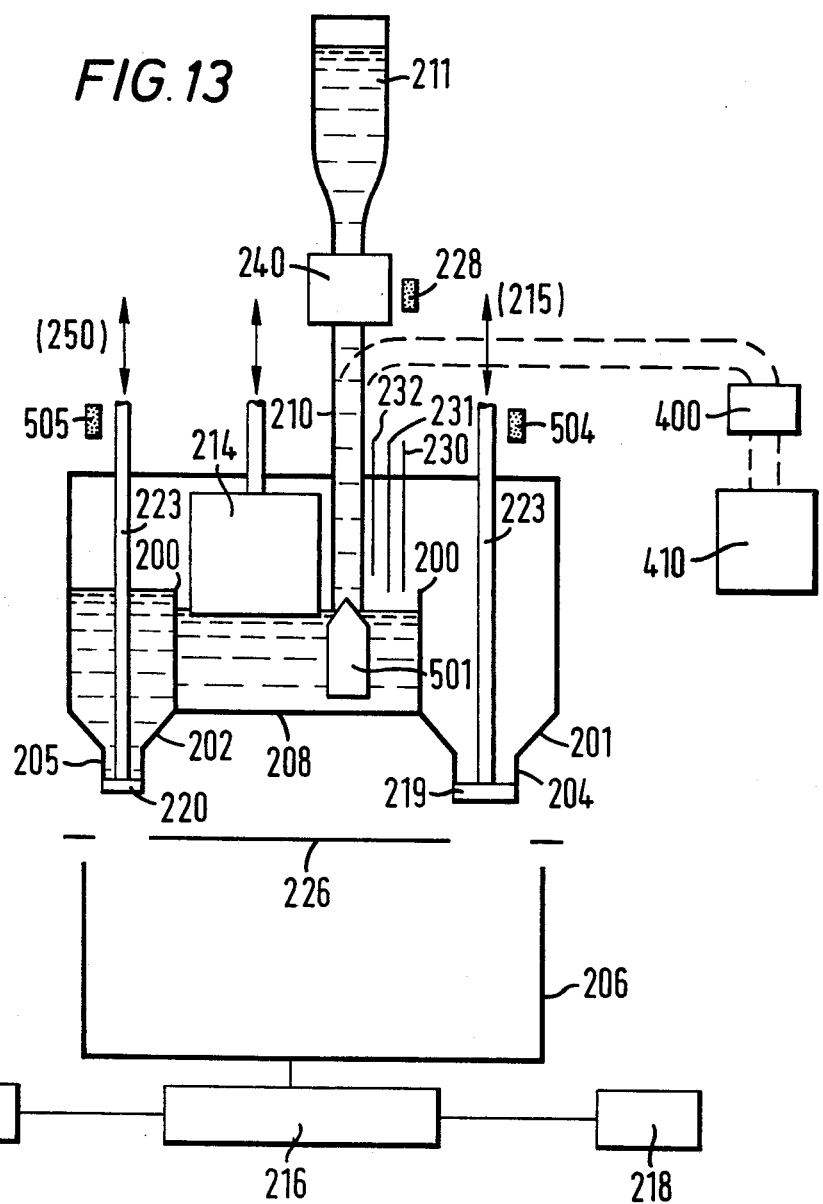
FIG. 13 is a schematic view of the apparatus of FIGS. 10-12.

The apparatus may be operated as follows. When a new bottle 211, with adaptor 240 attached, is inserted into the apparatus, sensor 228 (if provided) detects the presence of the adaptor to enable operation of the apparatus, and liquid from the bottle 211 flows down through the adaptor and feed pipe 210 to the prefill chamber 208. Flow continues until the liquid level in the prefill chamber rises to meet the feed pipe 210 such that the difference in pressures at the surfaces of the liquid in the prefill chamber 208 and bottle 211 balances the column of liquid extending up through the feed pipe 210, adaptor 240 and bottle 211. It should be noted in this respect that the float 501 is not essential but may be provided to shut off flow of liquid from the feed pipe 210 when a particular desired liquid level in the prefill chamber 208 has been reached, or as an additional means to guard against overfilling of the prefill chamber 208. The displacement device 214 is operated to raise the liquid level above the weirs 200 and is held down for a predetermined time such as 1.5 seconds. At the end of this time, the control unit 234 checks that the liquid level has reached probe 232 as a check that the dispensing chambers 201, 202 are fully charged, whereafter the displacement device 214 is retracted to allow the liquid level in the prefill chamber 208 to fall and for excess liquid in the dispensing chambers 201, 202 over and above the predetermined measures to overflow back over the weirs 200 into the prefill chamber 208, and to permit liquid transferred to the dispensing chambers 201, 202 to be replaced by additional liquid from the bottle until the liquid level in the prefill chamber 208 recovers its previous level and flow is terminated as before. Both dispensing chambers 201, 202 will now be filled and the liquid level in the prefill chamber 208 will be as shown in FIG. 13. This is the condition in which the apparatus will normally stand, ready to dispense a drink, either a single or a double measure.

When a drink is required, a glass 206 is placed on the pressure switch 216 to enable dispensing and either the single or double measure demand button 217 or 218 pressed. The controller unit 234 first checks that the liquid level in the prefill chamber 208 is not up to the probes 230, 231 (which are just below the level of the weirs 200) which the controller unit 234 would diagnose as a flood condition. If the probe 230 does detect liquid or sensor 228 detects that a bottle with adaptor is not in position, an "error" indicator 311 is illuminated and dispensing is inhibited, otherwise "ready" indicator 310 is illuminated. If the latter, the cycle continues on manual depression of either the single or double measure demand button 217 or 218 and dispenser solenoid 250 is energized to open outlet 204 and discharge the measure of drink in dispensing chamber 201. The seal 219 is held open for a predetermined time and the sensor 504 checks that this time has elapsed before the seal 219 is retracted to close the outlet 204. Additionally, if a double measure has been requested dispenser solenoid 251 is energized for the same predetermined time to discharge the measure in dispensing chamber 202 into the glass 206, sensor 505 similarly providing a check that this time has elapsed before the outlet 205 is resealed. The displacement device 114 is then operated as before to refill dispensing chamber 201 and, if a double measure has been dispensed, dispensing chamber 202. Probe 232 is used as before to provide a check that the dispensing chambers have been fully charged and the apparatus is then again ready to dispense a drink. If the liquid level does not reach the probe 232, this will indicate to the controller 234 that an undermeasure will be given and dispensing will be inhibited. An "empty" indicator light 255 will then be illuminated by the controller 234 to tell the operator that the bottle 211 is empty and requires replacement.

If for any reason the apparatus should flood, for example by ambient air seeping into the bottle adaptor 240 and bubbling up to the top of the bottle, or if the displacement device 214 sticks down, the probe 230 will detect liquid when a drink is requested and the controller 234 prevent dispensing.

FIG. 13 shows in ghost lines an alternative to the gravity feed described above, being a pump 400 which draws liquid from a reservoir 410 and supplies it to the feed pipe 210.

The apparatus and system of FIGS. 4–6, 8A–8D and 9–14 have been developed in a fairly involved manner as described but, as will be appreciated, the basic advantages of these embodiments of the invention stem from the predetermined volume measure of the dispensing chambers 201, 202 defined by the weirs 200. Thus the simple displacement device 214 can be used to fill the dispensing chambers and no precision metering of liquid is necessary to dispense the required measure to a high accuracy, ±0.5% or better. The apparatus also has the hygienic advantage of no contact with the glass except its base.

We claim:

1. Liquid dispensing apparatus comprising:
a first stationary liquid dispensing chamber defining therein a volume measure and having an outlet, first valve means for opening and closing the outlet, a prefill chamber, and filling means for filling the first dispensing chamber with liquid from the prefill chamber;
a second stationary liquid dispensing chamber defining therein a volume measure and having an outlet, second valve means for opening and closing the outlet of the second dispensing chamber, said filling means filling the second dispensing chamber with liquid from the prefill chamber; and
control means for independently operating the first and second valve means of each dispensing chamber, and for independently operating said filling means from the operation of said first and second valve means such that said control means selectively reciprocates said filling means relative to said first and second stationary liquid dispensing chambers to displace liquid from said prefill chamber into said dispensing chambers, and, selectively dispense contents from the respective outlet of either or both dispensing chambers by opening said valve means;
said control means being coupled to a sensing means which disables said valve means in the event the filling means fails to displace a sufficient amount of liquid into said dispensing chambers during a cycle;
the first and second dispensing chambers being in communication with the prefill chamber in such a way that liquid in excess of the measure overflows back to the prefill chamber.

2. Apparatus as claimed in claim 1 wherein the displacement device is solenoid-operated.

3. Apparatus as claimed in claim 1 further comprising switch means for selectively actuating one of the first and second valve means for opening and closing a corresponding one of the outlets to initiate a dispensing cycle during which at least one outlet is opened thereby dispensing the measure in the corresponding dispensing chamber, whereafter the outlet is closed and the corresponding dispensing chamber is refilled from the prefill chamber.

4. The liquid dispensing apparatus of claim 1 for the dispensing of alcoholic drinks.

5. Apparatus as claimed in claim 1 including means for monitoring and recording the volume of liquid dispensed, comprising a controller responsive to signals indicative of liquid dispensed from the apparatus.

6. Apparatus as claimed in claim 1 wherein liquid under gravity feed is supplied via a hydrostatic seal to the prefill chamber to replace the liquid transferred to the dispensing chamber.

7. Apparatus as claimed in claim 1 wherein liquid is supplied by a pump to the prefill chamber to replace the liquid trransferred to the dispensing chamber.

8. Apparatus as claimed in claim 1 further comprising detection means located adjacent each outlet of each dispensing chamber to detect leaks therefrom and provide an indication of the discharge of a measure of liquid from each dispensing chamber.

9. Apparatus as claimed in claim 1 further comprising overmeasure sensor means for detecting overfilling of each dispensing chamber.

10. Apparatus as claimed in claim 1, wherein the prefill chamber comprises first and second prefill chambers and the filling means comprises first and second filling means, the first filling means filling the first dispensing chamber with liquid from the first prefill chamber, and the second filling means filling the second dispensing chamber with liquid from the second prefill chamber, the control means independently operating said first and second filling means.

11. Apparatus as claimed in claim 10 further comprising undermeasure sensor means for detecting underfilling of each prefill chamber.

* * * * *